US011170652B2

United States Patent
Gardner et al.

(10) Patent No.: US 11,170,652 B2
(45) Date of Patent: Nov. 9, 2021

(54) SYSTEMS AND METHODS FOR IMPROVED VEHICLE ROUTING TO ACCOUNT FOR REAL-TIME PASSENGER PICKUP AND DROPOFF

(71) Applicant: Toyota Connected North America, Inc., Plano, TX (US)

(72) Inventors: Mathew D. Gardner, Lewisville, TX (US); Taylor G. Smith, Allen, TX (US)

(73) Assignee: Toyota Connected North America, Inc., Plano, TX (US)

(*) Notice: Subject to any disclaimer, the term of this patent is extended or adjusted under 35 U.S.C. 154(b) by 181 days.

(21) Appl. No.: 16/553,837

(22) Filed: Aug. 28, 2019

(65) Prior Publication Data
US 2020/0394922 A1 Dec. 17, 2020

Related U.S. Application Data

(60) Provisional application No. 62/859,799, filed on Jun. 11, 2019.

(51) Int. Cl.
*G08G 1/00* (2006.01)
*G08G 1/0968* (2006.01)
(Continued)

(52) U.S. Cl.
CPC .......... *G08G 1/20* (2013.01); *G01C 21/3415* (2013.01); *G01C 21/3438* (2013.01);
(Continued)

(58) Field of Classification Search
CPC .............. G08G 1/20; G08G 1/096811; G08G 1/096838; G01C 21/3415; G01C 21/3438; G01C 21/3453; G06Q 10/0631
See application file for complete search history.

(56) References Cited

U.S. PATENT DOCUMENTS

2010/0332273 A1* 12/2010 Balasubramanian .. G06Q 99/00
705/332
2017/0167882 A1 6/2017 Ulloa Paredes et al.
(Continued)

OTHER PUBLICATIONS

Fenton, "The Bees Algorithm for the Vehicle Routing Problem," found at: arXiv:1605.05448v1 [cs.NE] May 18, 2016.
(Continued)

*Primary Examiner* — Tyler J Lee
*Assistant Examiner* — Yufeng Zhang
(74) *Attorney, Agent, or Firm* — Christopher G. Darrow; Darrow Mustafa PC

(57) ABSTRACT

System, methods, and other embodiments described herein relate to improving vehicle routing for a mobility service. In one embodiment, a method includes, in response to receiving a routing request for the mobility service, determining candidate vehicles and candidate routes for the candidate vehicles to fulfill the routing request. The method includes evaluating the candidate routes using a meta-heuristic that modifies and assesses the candidate routes according to at least a fitness function defines attributes for constraining the candidate routes. The method includes providing a solution route from the candidate routes upon the solution route satisfying at least one solution condition.

20 Claims, 5 Drawing Sheets

(51) Int. Cl.
  *G06Q 10/06* (2012.01)
  *G01C 21/34* (2006.01)
(52) U.S. Cl.
  CPC ..... *G01C 21/3453* (2013.01); *G06Q 10/0631* (2013.01); *G08G 1/096811* (2013.01); *G08G 1/096838* (2013.01)

(56) References Cited

U.S. PATENT DOCUMENTS

| | | | |
|---|---|---|---|
| 2018/0143027 A1* | 5/2018 | Schlesinger | G06Q 50/30 |
| 2018/0224866 A1 | 8/2018 | Alonso-Mora et al. | |
| 2018/0231984 A1* | 8/2018 | Alonso-Mora | G06Q 10/0631 |
| 2019/0120640 A1 | 4/2019 | Ho et al. | |
| 2019/0228377 A1* | 7/2019 | Pande | G06Q 10/06315 |
| 2020/0097737 A1* | 3/2020 | Oesterling | G01C 21/32 |

OTHER PUBLICATIONS

Larsen, "Fast delta evaluation for the Vehicle Routing Problem with Multiple Time Windows", found at: arXiv:1905.04114v1 [math.OC] May 10, 2019.

Alzaqebah et al., "Bees Algorithm for Vehicle Routing Problems with Time Windows", International Journal of Machine Learning and Computing, vol. 8, No. 3, Jun. 2018.

Ghoseiri, "Dynamic Rideshare Optimized Matching Problem", found at: http://hdl.handle.net/1903/13023 (2012).

Lin et al., "A Probabilistic Approach for Demand-Aware Ride-Sharing" found at: arXiv:1905.00084v2 [cs.SY] May 5, 2019.

Santos et al., "Dynamic Taxi and Ridesharing: A Framework and Heuristics for the Optimization Problem", Proceedings of the Twenty-Third international joint conference on Artificial Intelligence (Aug. 2013).

Pham et al., The bees algorithm. Technical Note, Manufacturing Engineering Centre, Cardiff University, UK, 2005.

Dantzig et al., The truck dispatching problem. Management science, 6(1):80-91, 1959.

Holland et al., Ups optimizes delivery routes. Interfaces, 47(1):8-23, 2017.

Dantzig et al., Origins of the simplex method. Technical report, Stanford Univ CA Systems Optimization Lab, 1987.

Furtado et al., Pickup and delivery problem with time windows: a new compact two-index formulation. Operations Research Letters, 45(4):334-341, 2017.

Anbuudayasankar et al., Mixed-integer linear programming for vehicle routing problem with simultaneous delivery and pick-up with maximum route-length. International Journal of Applied Management and Technology, 6(1):2, 2008.

Colorni et al., Distributed optimization by ant colonies. In Proceedings of the first European conference on artificial life, vol. 142, pp. 134-142. Cambridge, MA, 1992.

Fraser at al., Simulation of genetic systems by automatic digital computers i. introduction. Australian Journal of Biological Sciences, 10(4):484-491, 1957.

Kirkpatrick et al., Optimization by simulated annealing. science, 220(4598):671-680, 1983.

Shaw, Using constraint programming and local search methods to solve vehicle routing problems. In International conference on principles and practice of constraint programming, pp. 417-431. Springer, 1998.

Augerat, et al., Computational results with a branch-and-cut code for the capacitated vehicle routing problem. 1998.

* cited by examiner

SYSTEMS AND METHODS FOR IMPROVED VEHICLE ROUTING TO ACCOUNT FOR REAL-TIME PASSENGER PICKUP AND DROPOFF

CROSS-REFERENCE TO RELATED APPLICATIONS

This application claims benefit of U.S. Provisional Application No. 62/859,799, filed on Jun. 11, 2019, which is herein incorporated by reference in its entirety.

TECHNICAL FIELD

The subject matter described herein relates, in general, to routing vehicles, and, more particularly, to dynamically routing vehicles for both real-time requests and previously scheduled requests simultaneously.

BACKGROUND

The growth of ridesharing, on-demand delivery services, and other similar mobility services creates greater strain on existing systems to become more efficient. For example, presently ridesharing services may accept on-demand riders, i.e., riders that are picked up mid-trip during another ride, which results in a deviation in an original trip. However, routing to pick-up such riders while also considering a ride experience of existing riders can be problematic. That is, because of limitations of existing solutions, selecting an ongoing ride to combine with a new route/ride request may suffer from inefficiencies that result in extensions in ride times for existing riders, and, thus, negative ride experiences.

In the setting of ridesharing, added constraints for accommodating such on-demand requests can result in a difficult-to-solve routing problem that becomes computationally infeasible within request confirmation timelines. Thus, systems may implement shortcuts that attempt to approximate an optimization of the route, but often fall short since the full set of possibilities are not considered. Instead, a system may select a vehicle/route according to statically defined preferences in order to provide a solution more quickly. Despite the growth in such ridesharing applications and other similar uses, the prior solutions for on-demand routing are generally not optimal and suffer from the noted difficulties.

SUMMARY

Example systems and methods relate to a manner of improving vehicle routing for a mobility service. As previously noted, efficiently routing vehicles especially within the context of shared rides and on-demand routing requests presents many different difficulties. Therefore, the disclosed approach implements an improved meta-heuristic for assigning requests to available vehicles that accounts for real-time requests in an on-demand setting while also functioning to process batches of requests efficiently. For example, in one or more aspects, the approach defines a set of constraints that force the disclosed approach to assess and provide routes that correlate with needs of the mobility service without extending run times and through parallel processing mechanisms.

To ensure the disclosed approach meets the particular objectives to improve routing, in one embodiment, a disclosed system defines, as an initialization routine, the constraints including associated hyper-parameters that constrain the optimization of a requested route. For example, the constraints/routing parameters can include a distance cost parameter for a route, a capacity enforcement parameter, a time overage parameter, a promptness parameter, and a trip duration parameter that together facilitate improving identification of a route for fulfilling a request. In general, the disclosed approach can process routing requests in batches (e.g., pre-booked routes) or in real-time in an on-demand fashion.

In either case, the disclosed system determines candidate vehicles that are available to fulfill the request(s) and initially seeds the vehicles with unassigned requests to produce candidate routes. Of course, a portion of the candidate vehicles may include trips that are presently in progress, however, the disclosed system can combine routes for various mobility services such as parcel delivery and/or ridesharing. As such, the disclosed system can then iteratively evaluate the candidate routes using the meta-heuristic, which is, for example, a large neighborhood search (LNS) algorithm. The system uses the LNS algorithm to iteratively assess and modify the candidate routes according to the constraints (i.e., fitness function). In various approaches, the system executes the meta-heuristic for a defined number of iterations, until a route having a threshold fitness score is discovered, and/or according to another solution condition. In this way, the disclosed system provides an efficient approach to discovering near-optimal routing solutions while further ensuring existing rides are not disrupted beyond an originally estimated trip duration.

In one embodiment, a routing system for improving routing of vehicles for a mobility service is disclosed. The routing system includes one or more processors and a memory communicably coupled to the one or more processors. The memory stores an acquisition module including instructions that when executed by the one or more processors cause the one or more processors to, in response to receiving a routing request for the mobility service, determine candidate vehicles and candidate routes for the candidate vehicles to fulfill the routing request. The memory further stores a routing module including instructions that when executed by the one or more processors cause the one or more processors to evaluate the candidate routes using a meta-heuristic that modifies and assesses the candidate routes according to at least a fitness function defines attributes for constraining the candidate routes. The routing module further includes instructions to provide a solution route from the candidate routes upon the solution route satisfying at least one solution condition.

In one embodiment, a non-transitory computer-readable medium for improving routing of vehicles for a mobility service and including instructions that when executed by one or more processors cause the one or more processors to perform one or more functions is disclosed. The instructions include instructions to, in response to receiving a routing request for the mobility service, determine candidate vehicles and candidate routes for the candidate vehicles to fulfill the routing request. The instructions include instructions to evaluate the candidate routes using a meta-heuristic that modifies and assesses the candidate routes according to at least a fitness function defines attributes for constraining the candidate routes. The instructions include instructions to provide a solution route from the candidate routes upon the solution route satisfying at least one solution condition.

In one embodiment, a method for improving vehicle routing for a mobility service is disclosed. In one embodiment, the method includes, in response to receiving a routing request for the mobility service, determining candidate vehicles and candidate routes for the candidate vehicles to fulfill the routing request. The method includes evaluating the candidate routes using a meta-heuristic that modifies and assesses the candidate routes according to at least a fitness function defines attributes for constraining the candidate routes. The method includes providing a solution route from the candidate routes upon the solution route satisfying at least one solution condition.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
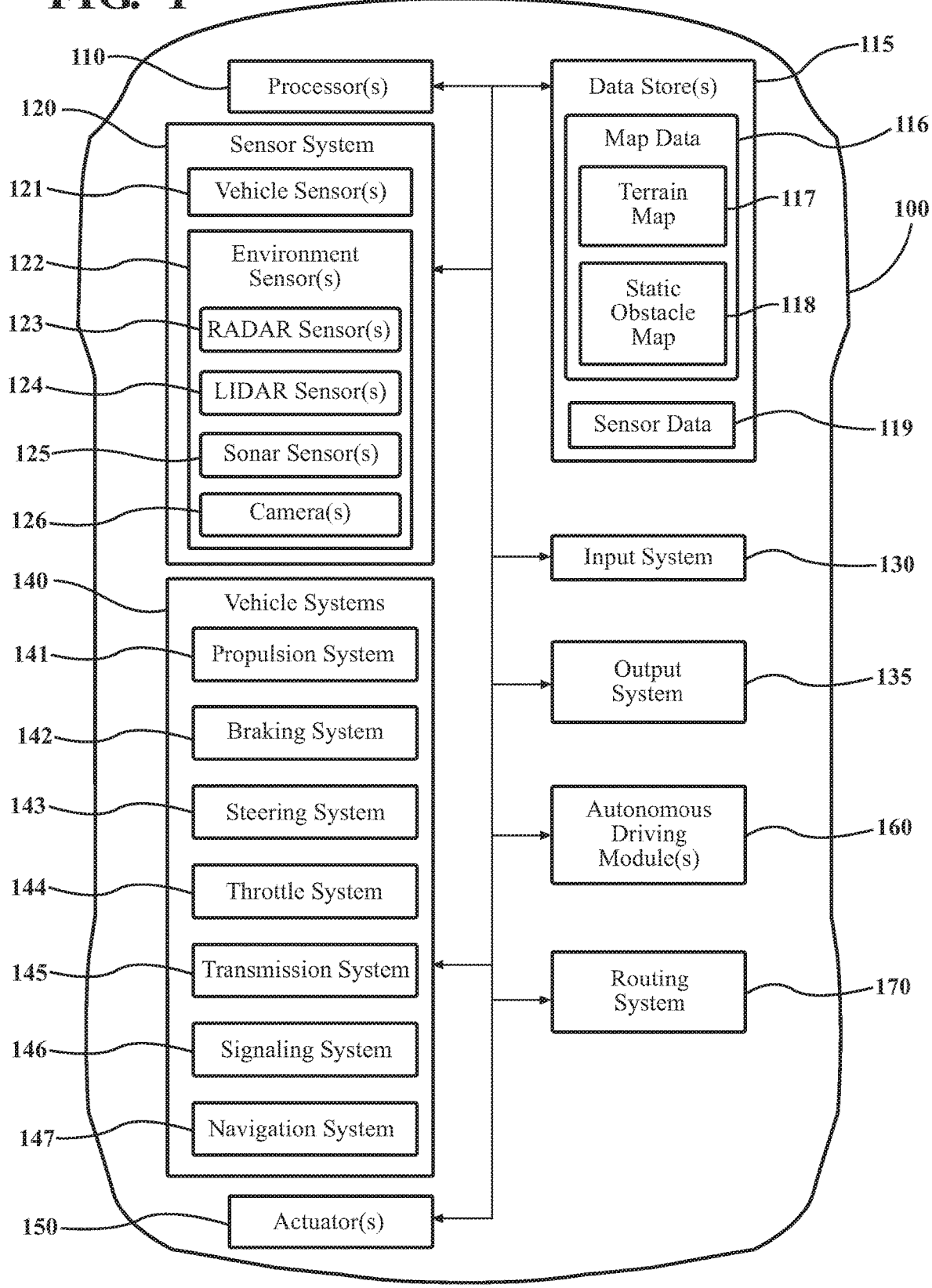
FIG. 1 illustrates one embodiment of a vehicle within which systems and methods disclosed herein may be implemented.

Systems, methods, and other embodiments associated with a manner of improving the routing of vehicles for a mobility service are disclosed. As previously noted, efficiently accommodating on-demand requests within the context of ridesharing or other mobility services can be a computationally infeasible problem. That is, for example, because the problem of identifying an efficient route while considering many different optimization parameters scales combinatorially, many existing approaches cannot resolve a vehicle assignment for a route request within a timeline that is considered reasonable for a waiting requestor and especially in light of various considerations such as ensuring the ride experience of riders that are underway without unduly extending rides. As such, current approaches generally encounter undesirable route selections or prolonged processing times due to the noted shortcomings.

Therefore, in one aspect, the present approach improves routing by providing for scheduling real-time dynamic requests simultaneously with existing requests (e.g., prior scheduled requests and/or requests that are presently being serviced). Moreover, in one approach, a system improves route planning for a mobility service by optimizing mid-trip pickup and drop-off. In one embodiment, a routing system implements a refined meta-heuristic that uses a particular set of routing constraints and defined routing parameters that are optimized to improve the fulfillment of routing requests. As one example, the system can define the routing parameters along with the constraints to account for particular objectives.

The noted objectives may include i) ensuring that vehicle capacity limitations (e.g., number of riders, number of parcels, weight) are not exceeded, ii) ensuring efficient runtimes (e.g., <5 seconds) through prioritizing discovery of feasible solutions, iii) providing solutions that approximate global optimum solution, iv) configuring processes to be parallelizable, v) accounting for schedules including scheduled pickup times, existing trips that are in-progress, and on-demand/real-time requests, vi) accounting for defined delivery times for existing cargo/riders within a slack window while permitting deviations for real-time requests, and vii) penalizing routes that extend ongoing trips beyond an estimated time for a direct route.

For example, in one aspect, the system performs dynamic route planning by using a unique cost function (also referred to as a fitness function) to better select a candidate vehicle to service a ride and to better order waypoints for the ride. The present approach is, for example, designed to optimize certain aspects of a route for ride-sharing and similar applications within the context of a vehicle routing problem (VRP). In particular, the system accounts for and optimizes various aspects of a ride in order to improve overall rider satisfaction within the context of a capacitated pickup and delivery problem with time windows and multiple trips (CPDPTWMT).

Accordingly, in one approach, the disclosed system implements the meta-heuristic with a fitness function according to the noted objectives. As such, the disclosed approach can initially define the routing parameters (e.g., a combination of constraints for a fitness function and assigned weights). For example, the routing parameters can include a distance cost parameter to minimize overall length for a route, a capacity enforcement parameter to ensure the capacity of a vehicle is not violated, a time overage parameter to account for commercial regulations that limit driver time/distances, a promptness parameter that penalizes arrival too early or too late to a destination, and a trip duration parameter that penalizes routes longer than a direct route. In other words, the system is optimizing a route, in one embodiment, for a ride-share to account for pickup/dropoff locations, a number of people that can ride in the vehicle, deviations from an originally planned route of a rider, and minimizing time in the vehicle to provide an overall better ride for ride-share passengers (e.g., performing additional pickups within a timeline of an original trip).

In a further aspect, the system can also define a solution condition such as a number of iterations to execute the meta-heuristic over the candidate routes, a threshold fitness score, and/or another condition for which the system exits execution of the meta-heuristic. Furthermore, it should be noted that the present approach is applicable to both real-time requests and to batch processing of routes for rides in the future (e.g., tomorrow's rides). Moreover, while this present disclosure is generally discussed within the context of ride-sharing, the present approach is applicable to other routing contexts such as package/parcel delivery, various types of vehicles (e.g., autonomous vehicles, manually driven, etc.), etc. Accordingly, the system implements the approach in a robust manner to handle the separate attributes of different mobility services and is generally adaptable to particular contexts through modification of the routing parameters.

In either case, the disclosed system determines candidate vehicles that are available to fulfill the request(s) and initially seeds the vehicles with unassigned requests to produce candidate routes (e.g., a course along various roadways between pickup and destination locations). Of course, a portion of the candidate vehicles may include trips that are presently in progress, however, the disclosed system can combine routes to share a candidate vehicle among multiple riders and/or multiple parcels.

As such, the disclosed system can then iteratively evaluate the candidate routes using the meta-heuristic, which is, for example, a large neighborhood search (LNS) algorithm. The system uses the LNS algorithm to iteratively assess and modify the candidate routes according to the routing parameters. Thus, the algorithm essentially searches over a broad set of candidate solutions while focusing on various local sites including modifying various candidate routes through a destroy/reconstruct mechanism that uses nearest-neighbor pairs to comparatively assess nearby alternatives. In this way, the disclosed system provides an efficient approach to discovering near-optimal routing solutions while further ensuring existing rides are not disrupted beyond an originally estimated trip duration.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of transport that, for example, provides transport for various cargo including people, packages, and so on.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a routing system 170 that is implemented to perform methods and other functions as disclosed herein relating to improving route planning for a vehicle. As will be discussed in greater detail subsequently, the routing system 170, in various embodiments, may be implemented partially within the vehicle 100 and may further exchange communications with additional aspects of the system 170 that are remote from the vehicle 100 in support of the disclosed functions.

Figure 2:
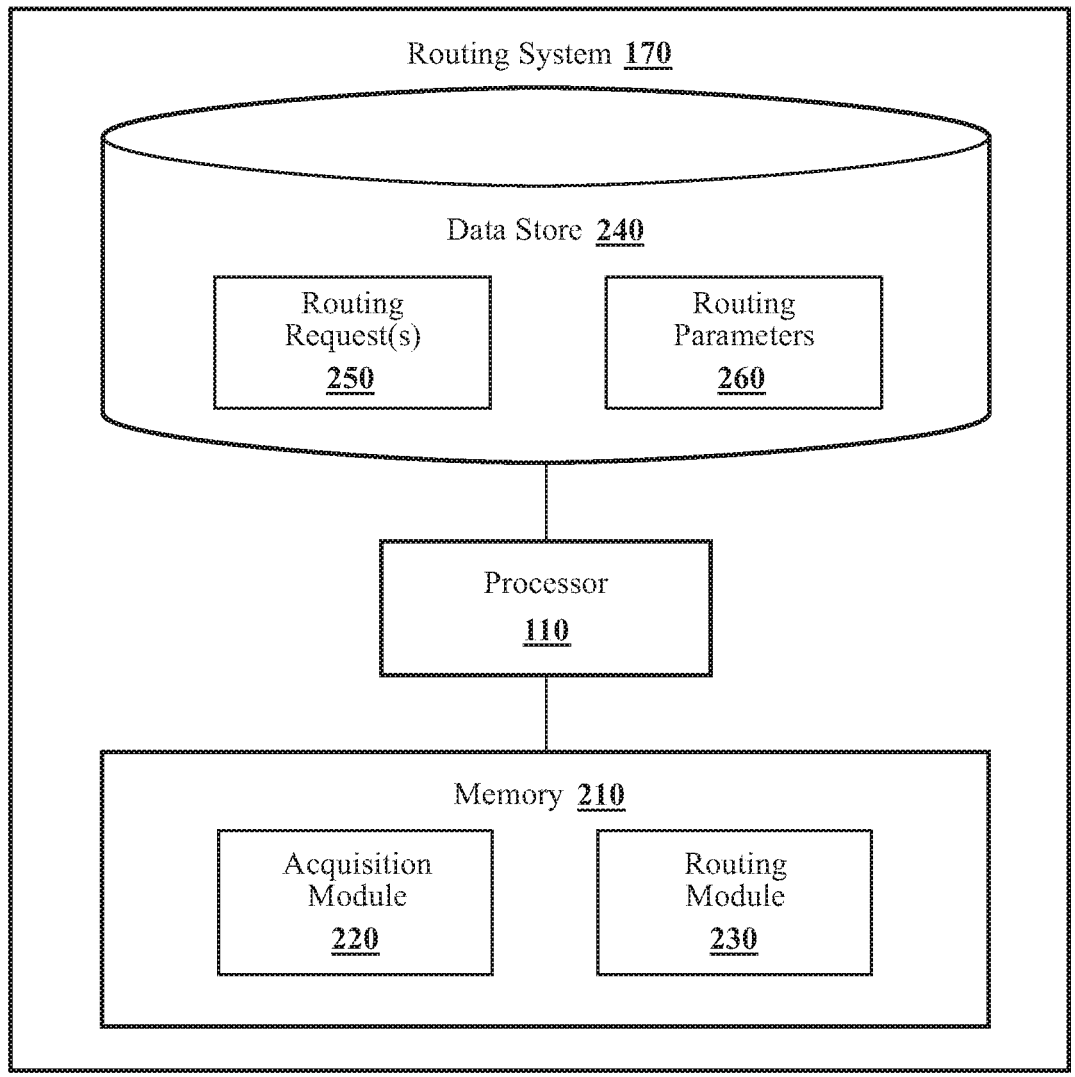
FIG. 2 illustrates one embodiment of a routing system.

With reference to FIG. 2, one embodiment of the routing system 170 of FIG. 1 is further illustrated. The routing system 170 is shown as including a processor 110 from the vehicle 100 of FIG. 1. Accordingly, the processor 110 may be a part of the routing system 170, the routing system 170 may include a separate processor from the processor 110 of the vehicle 100, the routing system 170 may access the processor 110 through a data bus or another communication path, or, in further aspects, the processor 110 is a cloud-based resource. In one embodiment, the routing system 170 includes a memory 210 that stores an acquisition module 220 and a routing module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions within the physical memory 210 that when executed by the processor 110 cause the processor 110 to perform the various functions disclosed herein.

Figure 3:
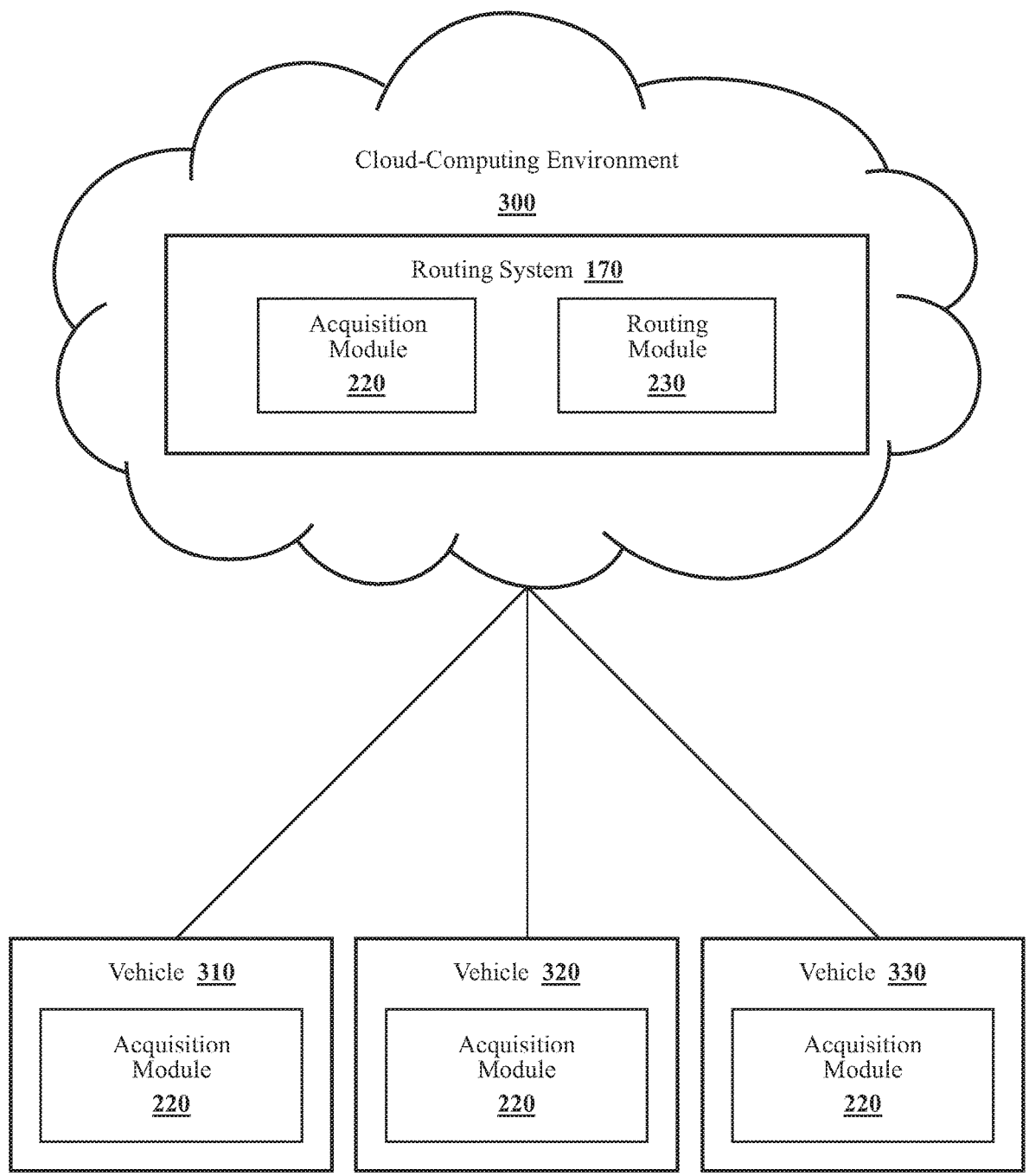
FIG. 3 illustrates a diagram of a routing system in a cloud-based configuration.

The routing system 170 may be further implemented as a cloud-based system that functions within a cloud-computing environment 300 as illustrated in relation to FIG. 3. That is, for example, the routing system 170 may receive routing requests from vehicles and/or mobile devices of users and execute as a cloud-based resource that is comprised of devices (e.g., distributed servers) remote from the vehicle 100 to determine the routes and assignments to candidate vehicles. Accordingly, the routing system 170 may communicate with vehicles (e.g., vehicles 310, 320, and 330) that are geographically distributed. In one approach, the system 170 collects location data and other information (e.g., rides that are presently in progress) from the vehicles in response to receiving a request. Moreover, the system 170 may communicate route assignments and other information to the vehicles and also to mobile devices (e.g., smartphones) associated with requesting parties (riders, parcel pickup/delivery customers, etc.). Additional aspects of the cloud computing environment 300 will be discussed in relation to components of the system 170 and FIG. 2.

Continuing with FIG. 2, in one embodiment, the acquisition module 220 includes instructions that function to control the processor 110 to receive a routing request 250 for the mobility service. The routing request 250 is, in one or more embodiments, a request to a mobility service for a pickup at a particular defined originating location and delivery/drop off to a destination location. In further embodiments, the routing request may define additional attributes of the transportation such as a pickup time for a pre-scheduled ride, a number of passengers, a number of parcels, attributes of the parcels (e.g., size, weight, etc.), particular needs (e.g., wheelchair access, suitcase space, etc.), and other attributes that may be selectively defined according to the implementation. In any case, at a base level of implementation, the routing request 250 ($r$) includes at least a pickup location (p) and a drop off location (d) such that each request includes a corresponding pair ($r_i=[p_i, d_i]$) where the pair is serviced by a single vehicle and $p_i$ is before $d_i$. Additionally, in general, the mobility service is a ridesharing service, package/parcel delivery service, food delivery service, or another transportation-based service that involves moving between different locations over a transportation network (e.g., roads, ferries, etc.) to pick up and deliver cargo in the form of people, and/or parcels.

Accordingly, the acquisition module 220 receives the routing request as a request for the mobility service. In one or more approaches, the acquisition module 220 may receive a single request 250 or a batch of requests 250 for processing. Thus, routing system 170 is generally configured to handle individual requests 250 on-demand in real-time as the requests are received and also in the form of a batch when, for example, processing pre-scheduled requests for a subsequent day or, more generally a future point in time.

Moreover, in one embodiment, the routing system 170 includes the data store 240. The data store 240 is, in one embodiment, an electronic data structure (e.g., a database) stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the request(s) 250 along with, for example, routing parameters 260 and or other information that is used by the modules 220 and 230.

Whether the requests 250 are real-time requests or batched requests for a future time, the acquisition module 220, in one embodiment, initially determines candidate vehicles for the request 250. For example, in one approach, the acquisition module 220 identifies which vehicles for the mobility service are within a defined distance of a pickup location of the routing request 250. Thus, the acquisition module 220 may actively monitor locations of the vehicles, or may alternatively directly inquire a separate instance of the acquisition module 220 embedded in the vehicle (e.g., vehicle 100) to determine locations and select a group within a defined radius (e.g., 20 miles) of the pickup location. Of course, depending on the number of available vehicles, the acquisition module 220 may dynamically reduce or expand the radius to provide a selection of candidate vehicles within a minimum and maximum.

When the routing requests 250 are for a batch of future scheduled rides, the acquisition module 220 identifies the candidate vehicles according to scheduled vehicles that are to be in service during the defined time periods, according to historically active vehicles, and/or separately schedules vehicles to fulfill the requests according to, for example, associated depot locations or locations from which the vehicles operate (e.g., homes of drivers, depots, etc.). In either case, the acquisition module 220 initially seeds the candidate vehicles with candidate routes. That is, in an instance where a request 250 is a real-time request, the acquisition module 220 seeds the candidate vehicles with an existing solution (i.e., while inserting a new request 250 randomly into a route of one of the candidate vehicles. As an additional note, the candidate routes/vehicles may be grouped into separate "sites" according to current locations, originating locations, etc.

In general, acquisition module 220 populates the candidate routes with new requests without regard to a feasibility of a particular vehicle servicing the request. That is, whether or not the vehicle is presently servicing a request and is underway does not influence whether the acquisition module 220 inserts the routing request 250 into that particular vehicle. In this way, the routing module 230 can generate combined/shared routes for a single vehicle within the context of ridesharing and shared parcel delivery.

Furthermore, the acquisition module 220 may undertake a further seeding process in the instance of future scheduled rides. For example, as previously noted, each request $r_i$ is comprised of two points, pickup location $p_i$, and a destination location $d_i$. Thus, each request is generally subject to the following constraints.

$$p_i \in v_k,$$

$$d_i \in v_k,$$

$$p_i \text{ before } d_i$$

Where V is a matrix of eligible vehicles, and $v_k$ is a vector representing the kth vehicle, meaning that both $p_i$ and $d_i$ belong to the same vehicle, and $p_i$ occurs prior to $d_i$, but not necessarily contiguously. As noted, each of the separate vehicles in V may already include an itinerary (i.e., route for another trip). Thus, each vehicle is seeded while honoring any existing ride that is present/ongoing within a vehicle. Pseudocode for an example seeding process that may be executed by the acquisition module 220 is shown below.

```
V = vehicles eligible for assignment
r = a collection of ride-share requests
for v_k ∈ V do
|      if v_k has assignments then
|      |      Initialize vehicle with its existing itinerary
|      else
|      |      Initialize v_k as empty vehicle
|      |      if any r_i ∈ r unassigned then
|      |      |      insertRandomUnassigned(r, v_k)
|      |      end
|      end
end
for r_i ∈ r do
|      if r_i unassigned then
|      |      v_r = selectRandomVehicle( )
|      |      insertIntoNearest(r_i, v_r)
|      end
end
```

As previously noted, the acquisition module 220 permits the insertion of new rideshare requests 250 into, in one embodiment, any point in a candidate vehicle's present route, allowing a candidate route to cause the candidate vehicle to deviate for a new pickup. The feasibility of such a deviation is assessed according to the fitness function, as subsequently described.

Once the acquisition module 220 identifies the candidate vehicles and generates the candidate routes, the routing module 230 evaluates the candidate routes. In one embodiment, the routing module 230 implements a meta-heuristic such as a large neighborhood search (LNS) algorithm that is optimized according to the previously noted objectives. As presently implemented, the LNS algorithm is adapted with particular characteristics to achieve the objectives.

For example, the LNS algorithm generally comprises two stages, a destroy stage and a reconstruct stage. These stages of the LNS algorithm can be characterized as modifying and assessing the candidate routes to search over possible solutions. During the destroy stage, the routing module 230 removes a random routing request 250 from at least one of the candidate routes without removing existing requests for onboard riders. That is, to ensure that existing rides are not switched between vehicles while the rides are in progress, the routing module 230 constrains the destroy phase to the requests 250 that are being presently analyzed for assignments to the candidate vehicles.

After the destroy stage, the routing module 230 reconstructs candidate routes for the requests 250 by inserting the removed requests into separate candidate routes/vehicles. For example, the routing module 230 uses a k-d tree that defines relationships between routing requests. In general, a k-d tree is a k-dimensional binary space partitioning tree that the routing system 170 implements as an electronic data structure. The routing module 230 initially populates the k-d tree with the requests 250, and, in one embodiment, the existing requests that are underway of the candidate vehicles. The routing module 230 populates the k-d tree in such a way that the k-d tree stores the requests while intrinsically encoding spatial relationships associated with pickup and destination points of the requests. Thus, the routing module 230 can use the k-d tree to identify requests that are nearest neighbors (i.e., spatially proximate).

As such, the routing module 230 reconstructs (also referred to as repairing) the removed requests by inserting the requests into candidate routes identified as nearest neighbors from the k-d tree. For example, the routing module 230 removes a first request from a candidate vehicle and inserts the request into a candidate route of a vehicle having an existing ride with pickup and destination points that are spatially close to that of the removed route as identified via the k-d tree. In this way, the routing module 230 uses the LNS algorithm to search between neighboring routes and find a solution.

Subsequently, the routing module 230 employs the LNS algorithm to further assess the new solution that was reconstructed in relation to the original solution using a fitness function, which will be discussed in greater detail subsequently. For example, pseudocode representing one approach of the routing module 230 applying the LNS algorithm is shown below:

```
Θ = current candidate route for request r
numSearches = randInt(0, max(1, ε * n))
for i ∈ num Searches do
|                Θ' = r
|                destroy(Θ');
|                repair (Θ');
|                if fitness(Θ') < fitness(Θ) then
|                |                    Θ = Θ'
|                end
end
Result: Θ
```

As shown, the routing module 230 determines fitness scores for the original candidate route and the reconstructed candidate route for the routing request. The routing module 230 compares the two fitness scores and retains the candidate route with the better fitness score, which can be defined as greater than or less than depending on a particular implementation and whether the scores are being minimized or maximized. In either case, the routing module 230 executes the LNS algorithm or another meta-heuristic as may be implemented by the routing module 230 to search for an optimal solution for the routing request 250. In various approaches, the routing module 230 iteratively executes the LNS algorithm until at least one of the candidate routes for a routing request 255 satisfies at least one solution condition. The solution conditions may be defined differently according to a particular implementation and even different executions of the algorithm within an implementation. For example, the routing module 230 defines, in one embodiment, a maximum number of iterations for the algorithm to execute, which may vary for a real-time request versus a batch including a multiplicity of routing requests 250. That is, because a real-time request is generally more time-sensitive than a batch request, the routing module 230 defines the solution condition to have fewer iterations in the interest of efficiency. By contrast, because a batch request generally includes many separate requests and is not time-sensitive, the routing module 230 may define the maximum number of iterations to be greater than the real-time request.

In any case, in one or more approaches, the routing module 230 further defines one or more additional solution conditions. For example, the routing module 230 may define a threshold fitness score, or other criteria by which the module 230 assesses a candidate route. In the instance of a threshold fitness score, the routing module 230 may iteratively execute the LNS algorithm over the solution space until a route having a fitness score that satisfies the threshold is discovered or until the maximum number of iterations are reached. Thus, the routing module 230 can define alternative stopping conditions for executing the algorithm that can, for example, improve the efficiency of generating the routes for the requests 250.

Continuing with the solution route, the routing module 230, upon determining the solution route satisfies the solution condition, provides the solution route to an associated one of the candidate vehicles. In one embodiment, the routing module 230 provides the solution route by assigning the routing request to a respective one of the candidate vehicles associated with the solution route. The routing module 230 may further electronically communicate the routing request to the respective vehicle to cause the vehicle to service the routing request. In further aspects, the routing module 230 may further provide communications to an end-user (i.e., the originator of the routing request), to a central dispatching system, and so on.

Furthermore, the solution route itself is generally provided as a set of waypoints (e.g., pickup and destination locations) and does not necessarily include actual route selection information (i.e., specific roadways) for the route. In a further aspect, the routing module 230 may provide the solution route with indicators about relative orders for waypoints especially where, for example, a vehicle is simultaneously servicing multiple routes in the context of a rideshare. Of course, while the routing module 230 generally provides the waypoints for a request without a specified route, in further embodiments, the routing module 230 can provide a complete route definition including selected roadways, and so on.

In any case, discussion of the routing system 170 will now focus on details about the fitness function that is implemented by the meta-heuristic (i.e., LNS algorithm) to assess the fitness of the candidate routes for requests 250. Initially, the routing module 230 defines routing parameters 260 including parameters/constraints of the fitness function and hyper-parameters/weights for separately weighting the different constraints. In one embodiment, the routing module 230 defines the routing parameters 260 as an initialization step and subsequently maintains the defined routing parameters 260 without modification or with modification for infrequent updates. Thus, it should be appreciated that the routing parameters 260 are generally defined initially and maintained throughout evaluation of the routes.

Accordingly, the routing module 230, in one approach, defines the routing parameters 260 to include separate constraints (also referred to as costs herein) and weights for the costs. In one approach, the costs include five separate components with a first cost as an overall distance of the solution route, a second cost as a capacity of the solution route for the cargo including one or more of parcels and riders, a third cost associated with candidate routes exceeding a time overage, a fourth cost as a promptness in relation to a pickup time and a drop off time, and a fifth cost as a trip length penalty.

As further explanation, the overall distance constraint is a combined distance (e.g., Manhattan distance) of each separate segment for a route. The capacity constraint of the solution is, for example, a hard constraint that caps how many passengers, parcels, or a combination can be present in the vehicle at a given time. Accordingly, the capacity constraint assesses each stop and ensures that a net onboarding of passengers/parcels for a stop does not exceed a defined capacity, which may vary on a per-vehicle basis. The time overage constraint generally defines an amount of distance or time-driven beyond the permissible amount. The permissible amount is defined according to a commercial regulation such as a may exist for commercial for-hire drivers or may be associated with overtime of a driver.

The promptness constraint and the trip length penalty constraint provide assurances that a total trip time will be minimized and that a trip for a rider will not be extended beyond an original estimated time beyond a defined slack. Accordingly, the promptness constraint penalizes a route for arriving too early or too late to a pickup location by using a difference between the requested pickup time and an estimated pickup time for the route. The trip length constraint penalizes routes that extend beyond an originally estimated duration for a total trip thereby preventing multiple deviations to pick up new passengers instead of proceeding to drop off a given passenger. It should be noted that the trip length constraint, while penalizing extended rides still permits deviations and combined rides so long as any time extension is not excessive. The routing parameters are represented below.

$$c(R) = \sum_{i \in R} c_{i,i+1} \quad (1)$$

$$d(R) = \max\left(\sum_{i \in R} d_i - q, 0\right) \quad (2)$$

$$t(R) = \max\left(\sum_{i \in P} t_i + c(R) - t, 0\right) \quad (3)$$

$$p(R) = \max\left(\sum_{i \in P} \text{abs}(p_i - r_i), 0\right) \quad (4)$$

$$s(R) = \sum_{c \in R} \begin{cases} \phi^{c_a/c_e}, & \text{if } c_a/c_e > 1 \\ 0, & \text{otherwise} \end{cases} \quad (5)$$

Where c(R) represents the overall distance constraint, d(R) represents capacity constraint, t(R) represents the time overage constraint, p(P) represents the promptness constraint, s(R) represents the trip length constraint. Additionally, $c_a$ and $c_e$ represent the estimated total duration of an actual trip, and the estimated duration of the direct trip requested. The fitness function is represented below in equation (6) with the prefixes ($\alpha$, $\beta$, $\gamma$, $\tau$) of the separate constraints representing weights/hyper-parameters assigned to the respective constraint.

$$f(\mathfrak{S}) = \Sigma_{R \in \mathfrak{S}} \left(c(R) + \beta d(R) + \gamma t(R) + \tau p(P) + s(R)\right) \quad (6)$$

Accordingly, the routing module 230 uses the fitness function within the LNS algorithm to assess separate candidate routes for fitness. It should be further noted, that each separate constraint except for the capacity constraint is considered within a slack window (i.e., variance). The capacity constraint is considered a hard-constraint since an overage results in too many riders or parcels, which is generally an infeasible circumstance for a vehicle, whereas differences in time or distance do not have the same implications. Thus, in one or more embodiments, the routing module 230 sorts the candidate routes according to the fitness scores at each iteration and, for example, removes a percentage k of the worst sites after $\lambda$ iterations. This permits the routing module 230 to focus on sites showing more promising results. In this way, the routing system 170 uses the fitness function to separately assess solutions within the two stages of the algorithm while also assessing the solutions overall.

Figure 4:
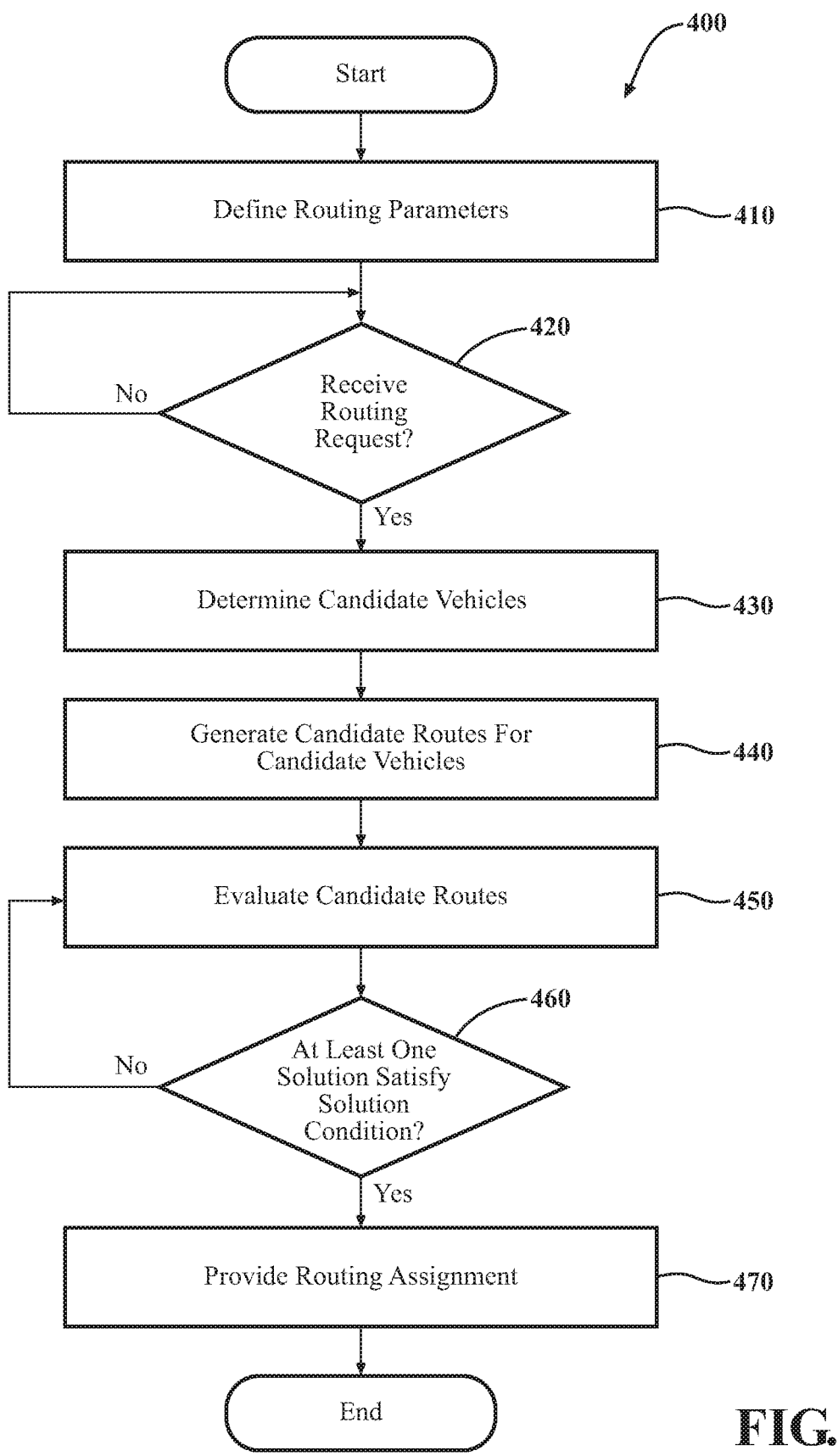
FIG. 4 is a flowchart illustrating one embodiment of a method associated with routing vehicles.

FIG. 4 illustrates a flowchart of a method 400 that is associated with dynamically generating route assignments in a ride-sharing context. Method 400 will be discussed from the perspective of the routing system 170 of FIG. 2. While method 400 is discussed in combination with the routing system 170, it should be appreciated that the method 400 is not limited to being implemented within the routing system 170 but is instead one example of a system that may implement the method 400. Of course, while the method is illustrated as a generally serial process, various aspects of the method 400 can execute in parallel to perform the noted functions.

At 410, the system 170 defines routing parameters 260 for assessing potential solutions. As previously outlined, the routing system 170 defines, in one or more embodiments, the routing parameters 260 as the five separate constraints that comprise the fitness function including hyper-parameters/weights indicating how the separate constraints are to be weighted in producing fitness scores. The system 170, in various approaches, initially defines the routing parameters 260 as an initial setup for implementing the meta-heuristic. It should be appreciated that various aspects of the routing parameters 260 may be defined with alternative values and/or configurations according to different circumstances. For example, the system 170 can define the capacity constraint variably according to attributes of a particular vehicle (e.g., number of seats for passengers).

Additionally, in one approach, the system 170 defines the solution condition(s) as part of the routing parameters. Thus, in addition to including hyper-parameters for the separate costs/components of the fitness function, the routing parameters 260 can also include definitions for maximum iterations for executing the meta-heuristic under different circumstances (e.g., batch vs. real-time), different threshold fitness scores, and so on.

At 420, the system 170 monitors for a routing request. In general, receiving a routing request is an inducing event that evokes further aspects of the method 400. Thus, the routing request may include real-time requests that cause immediate processing, or requests in batches such as for rides scheduled for a future point in time (e.g., next day) and may be serviced at a subsequent time. In either case, the routing system 170 proceeds with identifying and seeding a solution space as discussed at 430 and 440 once a request 250 or group of requests 250 are received.

Figure 5:
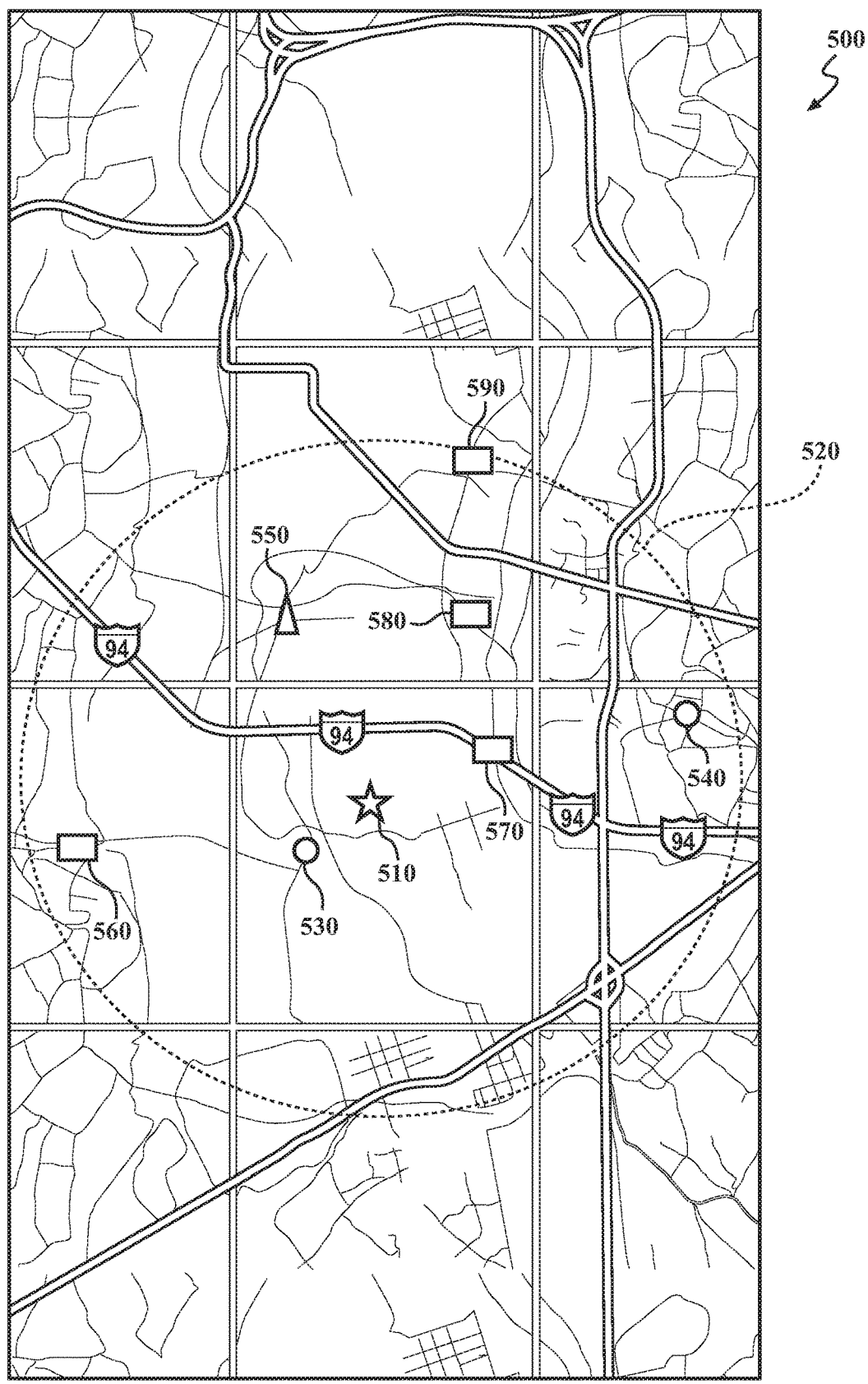
FIG. 5 is a map illustrating one example of how the disclosed systems and methods may generate routes/assignments.

At 430, the system 170 determines locations of candidate vehicles to fulfill the routing request. The routing request is generally a request to transport cargo from a point of origin to a destination. The cargo itself may take different forms such as people, packages, food items, or generally any other item that is to be transported between two locations (i.e., a pickup location and a destination). Thus, the system 170 may identify the candidate vehicles according to various required physical characteristics (e.g., passenger vehicle vs. parcel delivery vehicle), and also a distance from the pickup location for the request such as a geofenced area (as shown in FIG. 5). The geofenced area can be defined according to various dynamic characteristics such as a number of available vehicles, type of location, time of day, etc. In a further aspect, the area may be statically defined (e.g., a set radius, geographic boundaries, etc.). It should be noted that the system 170 does not generally discriminate against vehicles on the basis of existing/underway trips for a given vehicle when selecting candidate vehicles but instead assumes that subsequent analysis by the algorithm appropriately classifies the fitness of the vehicle for fulfilling the request.

At 440, the system 170 generates candidate routes for the candidate vehicles to fulfill the routing request. In one embodiment, the system 170 populates vehicles with candidate routes whether or not the vehicle already includes at least one trip. In this way, the system 170 permits shared rides/deliveries to provide a more efficient framework for routing rideshares and similar mobility services. Moreover, the particular approach to seeding candidate routes was outlined previously and thus will not be revisited for purposes of brevity. However, it should be appreciated that the initial population of candidate routes generally includes assigning the routing request to at least one candidate vehicle, which may involve interjecting pickup and destination waypoints into an existing route of a candidate vehicle or simply assigning the waypoints to an idle/unassigned vehicle.

At 450, the system 170 evaluates the candidate routes for the candidate vehicles. In one embodiment, the routing system 170 applies a meta-heuristic (e.g., the LNS algorithm) to iteratively modify and assess the candidate routes according to routing parameters that define attributes for constraining the candidate routes. In particular, the routing system 170 determines the fitness of an existing candidate route for the request and then modifies the candidate route to consider a nearest neighbor. The system 170 can then assess the modified route and determine which provides a better fitness according to the fitness function. The prevailing candidate route is retained for a subsequent iteration. In this way, the meta-heuristic searches over the solution space including the candidate routes to identify which routes are more fit (i.e., more efficient according to the defined routing parameters).

At 460, the routing system 170 determines whether a solution route satisfies a solution condition. As previously described, the solution condition(s) include, for example, a threshold value for the fitness score of the solution route and a number of iterations the routing system 170 has executed the meta-heuristic over the candidate routes. Thus, in one aspect, if the specified number of iterations are satisfied, then the routing system 170 returns the solution route from the set of candidate routes as the candidate route with the optimal fitness score (e.g., highest fitness score). In still further aspects, the routing system 170 may separately compare a highest fitness score from a corresponding one of the candidate routes with the threshold fitness value. In such a case, the routing system 170 may exit the loop between 450 and 460 when the fitness score satisfies the threshold.

At 470, the system 170 provides the solution route. In one embodiment, the routing system provides the solution route by assigning the routing request to a vehicle that corresponds with the solution route. Thus, the routing system 170 may electronically communicate at least pickup and destination locations to the vehicle. In a further aspect, the routing system 170 communicates the solution to an original requestor in addition to the vehicle in order to, for example, inform the requestor of the vehicle assignment. In this way, the routing system 170 can generate route assignments for both on-demand/real-time requests and batch requests while further considering additional factors such as existing ridership.

FIG. 5 illustrates an example of how the routing system 170 may select a candidate vehicle and a candidate route to service a routing request. As shown in FIG. 5, a pickup location 510 for a route request is centrally positioned in the map 500. Thus, the routing system 170 considers which vehicles are available within a defined area 520 about the pickup location 510. Candidate vehicles 530 and 540 are represented by ovals indicating routes that are underway and are presently at capacity, candidate vehicle 550 is represented by a triangle indicating no presently assigned route, and candidate vehicles 560, 570, 580, and 590 are represented by rectangles indicating routes that are underway but are not at capacity.

Accordingly, the routing system 170 initially seeds the candidate vehicles with the existing routes and, thus, seeds the unassigned vehicle 550 with the newly received route for 510. As part of executing the LNS algorithm over the candidate routes, the system determines the fitness of 550 fulfilling the request and further assesses at least one neighbor (e.g., a nearest neighbor from the k-d tree such as 580). The routing system 170 repeats this process iteratively across the candidate vehicles. Certain ones of the candidate vehicles being considered will clearly result in unfit solutions. For example, vehicles 530 and 540 servicing the request would result in capacity violations as determined by the routing system 170. While intuition may indicate that the unassigned vehicle 550 would likely have the best fitness, depending on other assigned pickup and dropoff locations for the vehicles 560, 570, 580, and 590, one of these vehicles may actually result in a better fitness score. In either case, the routing system 170 iteratively considers different combinations of waypoints for the vehicles 560, 570, 580, and 590 while honoring the existing routes that are underway. In this way, the routing system 170 searches over a plurality of candidate solutions to ultimately provide one of the vehicles with the assignment. As such, the routing system 170 communicates the assignment to the vehicle with the candidate route having a fitness score that is relatively optimized for the searched routes and the vehicle then services the pickup at 510.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the routing system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the routing system 170, and/or the autonomous driving module(s) 160 may control some or all of these vehicle systems 140 and, thus, may be partially or fully autonomous.

The processor(s) 110, the routing system 170, and/or the autonomous driving module(s) 160 can be operatively connected to communicate with the various vehicle systems 140 and/or individual components thereof. For example, returning to FIG. 1, the processor(s) 110, the routing system 170, and/or the autonomous driving module(s) 160 can be in communication to send and/or receive information from the various vehicle systems 140 to control the movement, speed, maneuvering, heading, direction, etc. of the vehicle 100. The processor(s) 110, the routing system 170, and/or the autonomous driving module(s) 160 may control some or all of these vehicle systems 140.

The processor(s) 110, the routing system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the routing system 170, and/or the autonomous driving module(s) 160 can control the direction and/or speed of the vehicle 100. The processor(s) 110, the routing system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s)

160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the routing system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A routing system for improving routing of vehicles for a mobility service, comprising:
   one or more processors; and
   a memory communicably coupled to the one or more processors and storing:
   an acquisition module including instructions that when executed by the one or more processors cause the one or more processors to, in response to receiving a routing request for the mobility service, determine candidate vehicles and candidate routes for the candidate vehicles to fulfill the routing request; and
   a routing module including instructions that when executed by the one or more processors cause the one or more processors to:
      evaluate the candidate routes using a meta-heuristic that modifies and assesses the candidate routes according to at least a fitness function defining attributes for constraining the candidate routes, wherein the routing module includes instructions to evaluate including instructions to i) remove the routing request from at least one of the candidate routes without removing existing requests for onboard riders, and ii) reconstructing the at least one of the candidate routes using a pre-computed nearest neighbor k-d tree to identify a nearest neighbor pair and insert the routing request into the at least one of the candidate routes, and
      provide a solution route from the candidate routes upon the solution route satisfying at least one solution condition by electronically communicating the routing request to a respective one of the candidate vehicles to cause the respective one of the candidate vehicles to service the routing request on-demand.

2. The routing system of claim 1, wherein the acquisition module further includes instructions to define, prior to receiving the routing request, routing parameters of the fitness function to control how the fitness function assesses the candidate routes to serve as the solution route,
   wherein the acquisition module includes the instructions to define the routing parameters including instructions to define at least weights for constraints of the fitness function including: a first cost as an overall distance of the solution route, a second cost as a capacity of the solution route for cargo including one or more of parcels and riders, a third cost associated with the solution route exceeding a time overage, a fourth cost as a promptness in relation to a pickup time and a drop off time, and a fifth cost as a trip length penalty, and
   wherein the at least one solution condition is based, at least in part, on the routing parameters.

3. The routing system of claim 1, wherein the routing module includes instructions to evaluate the candidate routes using the meta-heuristic including instructions to perform a large neighborhood search (LNS) over the candidate routes, wherein a nearest neighbor pair is a separate request for the mobility service that includes a pickup location and a destination location.

4. The routing system of claim 1, wherein the routing module includes instructions to evaluate the candidate routes including instructions to sort the candidate routes according to fitness scores produced using the fitness function that is part of the meta-heuristic,
   wherein the fitness function assesses the candidate routes according to a set of constraints that separately value aspects of the candidate routes, and
   wherein the at least one solution condition indicates at least a number of iterations to evaluate the candidate routes using the meta-heuristic.

5. The routing system of claim 1, wherein the routing module includes instructions to determine the candidate vehicles including instructions to identify which of the vehicles for the mobility service are within a defined distance of a pickup location of the routing request,
   wherein the routing module includes instructions to determine the candidate routes for the candidate vehicles including instructions to populate the candidate routes with an originating point and a destination point for at least the routing request, and
   wherein one or more of the candidate vehicles include a trip that is underway for which populating an associated candidate route includes generating a deviation to the trip.

6. The routing system of claim 1, wherein the routing module includes instructions to provide the solution route including instructions to assign the routing request to the respective one of the candidate vehicles associated with the solution route and to cause the respective one of the candidate vehicles to service the routing request on-demand including deviating from a current trip to fulfill the routing request.

7. The routing system of claim 1, wherein the routing module includes instructions to evaluate the candidate routes iteratively until satisfying a number of iterations for evaluating as specified by the solution condition,
wherein the mobility service is a rideshare service, and
wherein the acquisition module includes instructions to receive the routing request including instructions to receive multiple routing requests for a future time to process as a batch.

8. The routing system of claim 1, wherein one or more of the candidate vehicles are autonomous vehicles.

9. A non-transitory computer-readable medium storing for improving routing of vehicles for a mobility service and including instructions that when executed by one or more processors cause the one or more processors to:
in response to receiving a routing request for the mobility service, determine candidate vehicles and candidate routes for the candidate vehicles to fulfill the routing request;
evaluate the candidate routes using a meta-heuristic that modifies and assesses the candidate routes according to at least a fitness function defining attributes for constraining the candidate routes, wherein the instructions to evaluate include instructions to i) remove the routing request from at least one of the candidate routes without removing existing requests for onboard riders, and ii) reconstructing the at least one of the candidate routes using a pre-computed nearest neighbor k-d tree to identify a nearest neighbor pair and insert the routing request into the at least one of the candidate routes; and
provide a solution route from the candidate routes upon the solution route satisfying at least one solution condition by electronically communicating the routing request to a respective one of the candidate vehicles to cause the respective one of the candidate vehicles to service the routing request on-demand.

10. The non-transitory computer-readable medium of claim 9, wherein the instructions further include instructions to define, prior to receiving the routing request, routing parameters of the fitness function to control how the fitness function assesses the candidate routes to serve as the solution route,
wherein the instructions to define the routing parameters include instructions to define at least weights for constraints of the fitness function including: a first cost as an overall distance of the solution route, a second cost as a capacity of the solution route for cargo including one or more of parcels and riders, a third cost associated with the solution route exceeding a time overage, a fourth cost as a promptness in relation to a pickup time and a drop off time, and a fifth cost as a trip length penalty, and
wherein the at least one solution condition is based, at least in part, on the routing parameters.

11. The non-transitory computer-readable medium of claim 9, wherein the instructions to evaluate the candidate routes using the meta-heuristic include instructions to execute a large neighborhood search (LNS) over the candidate routes, wherein a nearest neighbor pair is a separate request for the mobility service that includes a pickup location and a destination location.

12. The non-transitory computer-readable medium of claim 9, wherein the instructions to evaluate the candidate routes include instructions to sort the candidate routes according to fitness scores produced using the fitness function that is part of the meta-heuristic,
wherein the fitness function assesses the candidate routes according to a set of constraints that separately value aspects of the candidate routes, and
wherein the at least one solution condition indicates at least a number of iterations to evaluate the candidate routes using the meta-heuristic.

13. The non-transitory computer-readable medium of claim 9, wherein the instructions to determine the candidate vehicles include instructions to identify which of the vehicles for the mobility service are within a defined distance of a pickup location of the routing request,
wherein the instructions to determine the candidate routes for the candidate vehicles include instructions to populate the candidate routes with an originating point and a destination point for at least the routing request, and
wherein one or more of the candidate vehicles include a trip that is underway for which populating an associated candidate route includes generating a deviation to the trip.

14. A method for improving routing of vehicles for a mobility service, comprising:
in response to receiving a routing request for a mobility service, determining candidate vehicles and candidate routes to fulfill the routing request;
evaluating the candidate routes using a meta-heuristic that modifies and assesses the candidate routes according to at least a fitness function defining attributes for constraining the candidate routes, wherein evaluating includes i) removing the routing request from at least one of the candidate routes without removing existing requests for onboard riders, and ii) reconstructing the at least one of the candidate routes using a pre-computed nearest neighbor k-d tree to identify a nearest neighbor pair and insert the routing request into the at least one of the candidate routes; and
providing a solution route from the candidate routes upon the solution route satisfying a solution condition by electronically communicating the routing request to a respective one of the candidate vehicles to cause the respective one of the candidate vehicles to service the routing request on-demand.

15. The method of claim 14, further including:
defining, prior to receiving the routing request, routing parameters of the fitness function to control how the fitness function assesses the candidate routes to serve as the solution route,
wherein defining the routing parameters includes defining at least weights for constraints of the fitness function including: a first cost as an overall distance of the solution route, a second cost as a capacity of the solution route for cargo including one or more of parcels and riders, a third cost associated with the solution route exceeding a time overage, a fourth cost as a promptness in relation to a pickup time and a drop off time, and a fifth cost as a trip length penalty, and
wherein the at least one solution condition is based, at least in part, on the routing parameters.

16. The method of claim 14, wherein evaluating the candidate routes using the meta-heuristic includes performing a large neighborhood search (LNS) over the candidate routes, wherein a nearest neighbor pair is a separate request for the mobility service that includes a pickup location and a destination location.

17. The method of claim 14, wherein evaluating the candidate routes includes sorting the candidate routes according to fitness scores produced using the fitness function that is part of the meta-heuristic, wherein the fitness function assesses the candidate routes according to a set of constraints that separately value aspects of the candidate routes, and wherein the at least one solution condition indicates at least a number of iterations to evaluate the candidate routes using the meta-heuristic.

18. The method of claim 14, wherein determining the candidate vehicles includes identifying which of the vehicles for the mobility service are within a defined distance of a pickup location of the routing request, wherein determining the candidate routes for the candidate vehicles includes populating the candidate routes with an originating point and a destination point for at least the routing request, and wherein one or more of the candidate vehicles include a trip that is underway for which populating an associated candidate route includes generating a deviation to the trip.

19. The method of claim 14, wherein providing the solution route includes assigning the routing request to respective one of the candidate vehicles associated with the solution route and causing the respective one of the candidate vehicles to service the routing request on-demand including deviating from a current trip to fulfill the routing request.

20. The method of claim 14, wherein evaluating the candidate routes executes iteratively until satisfying a number of iterations for evaluating the candidate routes as specified by the solution condition, wherein the mobility service is a rideshare service, and wherein receiving the routing request includes receiving multiple routing requests for a future time to process as a batch.

* * * * *